United States Patent
Kim (10) Patent No.: US 7,359,385 B2
(45) Date of Patent: Apr. 15, 2008

(54) ATM SWITCHING APPARATUS AND METHOD

(75) Inventor: Jong Cheon Kim, Ansan-si (KR)

(73) Assignee: LG-Nortel Co., Ltd., Seoul (KR)

( * ) Notice: Subject to any disclaimer, the term of this patent is extended or adjusted under 35 U.S.C. 154(b) by 845 days.

(21) Appl. No.: 10/639,637

(22) Filed: Aug. 13, 2003

(65) Prior Publication Data

US 2004/0037281 A1    Feb. 26, 2004

(30) Foreign Application Priority Data

Aug. 22, 2002    (KR) .................... 10-2002-0049708

(51) Int. Cl.
*H04L 12/28* (2006.01)

(52) U.S. Cl. .................. 370/395.4; 370/412; 370/429

(58) Field of Classification Search ............... 370/229, 370/230, 230.1, 231, 235, 400, 401, 428, 370/395.4, 412–419, 429

See application file for complete search history.

(56) References Cited

U.S. PATENT DOCUMENTS

| | | | | |
|---|---|---|---|---|
| 5,255,265 A | * | 10/1993 | Eng et al. | 370/416 |
| 5,694,554 A | * | 12/1997 | Kawabata et al. | 370/412 |
| 5,999,515 A | * | 12/1999 | Ohashi | 370/230.1 |

* cited by examiner

*Primary Examiner*—Wing Chan
*Assistant Examiner*—Duc Duong
(74) *Attorney, Agent, or Firm*—Ked & Associates, LLP (57) ABSTRACT

An ATM switching apparatus and method in which delay of ATM cells is prevented and multicast is implemented are disclosed. The multicast is determined by analyzing a received cell's destination address and the transfer times value. If there are several destination addresses, the same cell buffer address is stored in the respective destination addresses. By using the cell buffer addresses stored in the respective destination address, the cells are transferred until the transfer times value becomes zero. If the transfer times value becomes zero, the cell buffer address used at this time is stored into the cell buffer address storage unit making it available to use as an address for storing a new cell.

19 Claims, 4 Drawing Sheets

ATM SWITCHING APPARATUS AND METHOD

BACKGROUND OF THE INVENTION

1. Field of the Invention

The present invention relates to an ATM switch, and more particularly, to ATM switching apparatus and method in which a multicast is implemented by masking at least one or more destination nodes with fixed bit.

2. Background of the Related Art

Generally, asynchronous transfer mode (ATM) technology processes data communication using a switching technique which is employed in voice communication.

The ATM uses a virtual channel circuit switching and transfers data on cells having fixed-length 53-byte unit. In other words, the ATM is a switch for transferring cells to destination addresses via proper output ports with reference to a predetermined transmission table based on virtual path identifier/virtual channel identifier (VPI/VCI) values existing in a header of the cell inputted through an input port.

Figure 1:
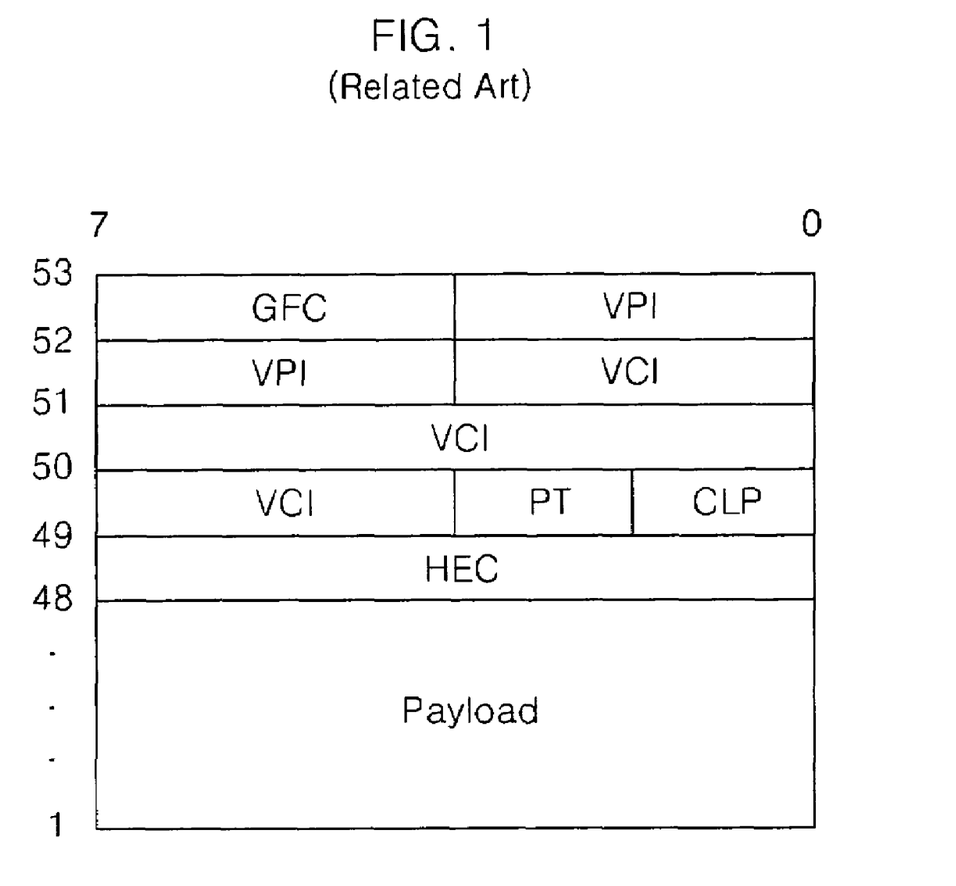
FIG. 1 is a view showing a standard construction format of a conventional ATM cell.

FIG. 1 is a view showing a standard construction format of a related art ATM cell. The ATM cell is generally divided into a 48-byte payload on which data is loaded and a 5-byte header on which control information is loaded. The header includes a generic flow control (GFC) indicating traffic adjusting information, a VPI/VCI for setting virtual path/virtual channel, a payload type (PI) used to indicate the presence of user information, a cell loss priority (CLP) indicating a discard priority of cells, and a header error check (HEC) used to detect a head error.

In order to implement multicasting communications in broadband integrated services digital network (BISDN) which uses standard ATM cells having the header constructed as above, one input source should be duplicated as many times as the number of output points and then routed to designated output points. Among methods proposed to implement these functions, typical is a duplication network in which outputted cells are fed back and again buffered by an input buffer. At this time, a cell delay occurs which degrades a performance of ATM switch.

SUMMARY OF THE INVENTION

An object of the invention is to solve at least the above problems and/or disadvantages and to provide at least the advantages described hereinafter. Accordingly, the present invention is directed to an ATM switching apparatus and method that substantially obviate one or more problems due to limitations and disadvantages of the related art.

Embodiments of the present invention provide an ATM switching apparatus and method in which multicasting is implemented without cell delay in a switch by re-defining a header of ATM cell to be suitable for multicasting communications, when internal buses of circuit switching system are configured using ATM cells instead of ATM cells of BISDN.

Further embodiments of the present invention provided an ATM switching method which comprises: storing a received cell, a cell buffer address and the transfer times value wherein the received cell includes a destination address and the transfer times value and a cell buffer address storage unit stores the cell buffer address; and transferring the received cell according to a control information obtained by a loading of a scheduler with respect to a schedule queue in which the cell buffer address is stored.

The control information can include the destination address and the cell buffer address. The ATM switching method further comprises: determining whether to further transfer cells using the transfer times value, the transfer times value being obtained by the loading of the scheduler; if there are not the cells to be further transferred, storing the cell buffer address of the control information into the cell buffer storage unit; and if there is the cell to be further transmitted, updating a subtracted value of the transfer times value to the same area in which the previous transfer times value is stored.

According to embodiments of the present invention, an ATM switching method comprises: a) checking a destination address and transfer times value from a cell temporarily stored through a reception interface, and receiving a cell buffer address from a cell buffer address storage unit; storing the cell into a cell buffer corresponding to the cell buffer address, storing the transfer times value into a schedule table corresponding to the cell buffer address, and storing the cell buffer address into a schedule queue corresponding to the destination address; b) obtaining a first control information by loading the schedule queue in sequence; and c) transferring the cell stored in the cell buffer through a transmission interface based on the control information.

The first control information can include a first destination address and cell buffer address. Additionally, the ATM switching method further comprises: obtaining transfer times value from the schedule table using the cell buffer address of the first control information obtained from the scheduler; determining whether or not a subtracted value of the transfer times value is zero; if the subtracted value is not zero, again storing the subtracted transfer times value into the schedule table corresponding to the cell buffer address; storing the cell buffer address of the first control information into the cell buffer address storage unit if the subtracted value is zero; if the subtracted transfer times value is again stored into the schedule table, obtaining a second control information by repeatedly performing the step c); and transferring the cell stored in the cell buffer through the transmission interface based on the second control information.

The second control information can include a second destination address and cell buffer address. The first destination address of the first control information is different from the second destination address of the second control information. The cell buffer address of the first control information is identical to the cell buffer address of the second control information.

According to other embodiments of the present invention, an ATM switching apparatus comprises: a reception cell control means for checking a destination address and transfer times value from a cell received trough a reception interface, storing the cell buffer address provided from a cell buffer address storage means into a schedule queue corresponding to the destination address, and storing the transfer times value into a schedule table corresponding to the cell buffer address; a scheduler for obtaining a first control information by loading the schedule queue, and determining whether or not there is another destination address to be transferred using the first control information; and a transmission cell control means for transferring the cell through a transmission interface according to the first control information provided from the scheduler.

The reception cell control means stores the cell into a cell storage means corresponding to the cell buffer address. The cell storage means includes a plurality of cell buffers to which cell buffer addresses are allocated. The destination address is allocated to the schedule queue, and a plurality of sub-schedule queues are provided, the cell buffer address being stored in the sub-schedule queues corresponding to the destination address masked to the cell. The schedule table includes a plurality of subtables to which the cell buffer addresses are allocated, in which the number of subtables is equal to that of cell buffers provided at the cell storage means.

The scheduler determines whether or not a subtracted value of the transfer times value is zero, and if the subtracted value is zero, the cell buffer address of the first control information is stored into the cell buffer address storage means. If the subtracted value is not zero, the subtracted transfer times value is stored into the schedule table so as to correspond to the cell buffer address. If the scheduler stores the subtracted transfer times value into the schedule table, a second control information is obtained from the schedule queue and transferred to the transmission cell control unit, and the cell stored in the cell buffer is transferred through the transmission interface.

It is to be understood that both the foregoing general description and the following detailed description of the present invention are exemplary and explanatory and are intended to provide further explanation of the present invention as claimed. Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to describe embodiments of the present invention. In the drawings.

DETAILED DESCRIPTION OF PREFERRED EMBODIMENTS

Figure 2:
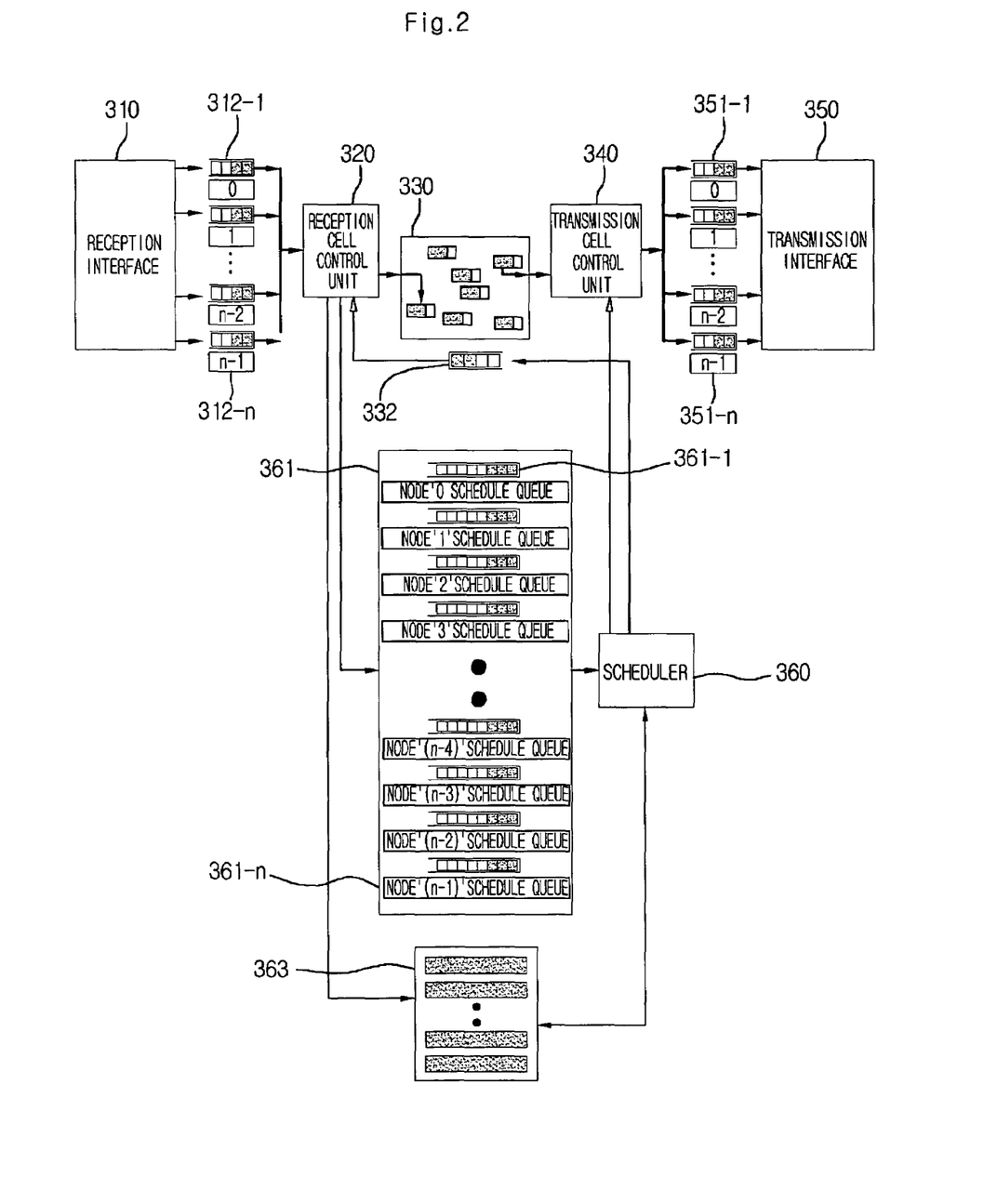
FIG. 2 is a view illustrating a construction of an ATM switching apparatus in accordance with embodiments of the present invention.

Reference will now be made in detail to embodiments of the present invention with reference to the attached drawings. FIG. 2 is a view illustrating a construction of an ATM switching apparatus in accordance with an embodiment of the present invention.

Referring to FIG. 2, the ATM switching apparatus includes a reception interface 310, reception cell temporary storage units 312-1 to 312-n, a reception cell control unit 320, a cell storage unit 330, a cell buffer address storage unit 332, a schedule queue 361, a schedule table 363, a scheduler 360, a transmission cell control unit 340, transmission cell temporary storage units 351-1 to 351-n, and a transmission interface 350.

Figure 3:
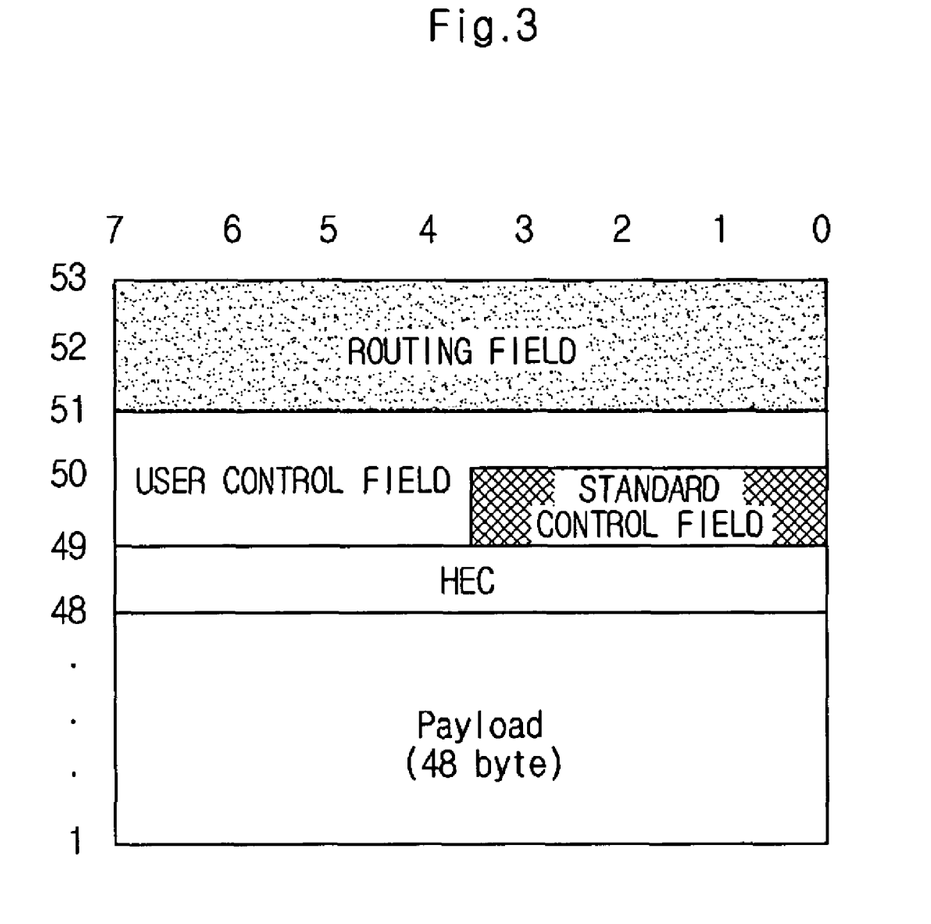
FIG. 3 is a view illustrating a construction format of an ATM cell in accordance with embodiments of the present invention.

The reception interface 310 stores a cell received through an internal physical layer into the reception cell temporary storage units 312-1 to 312-n. Here, as shown in FIG. 3, the cell includes a 16-bit (i.e., 2-byte) routing field which can support sixteen nodes. In the routing field, one node can be masked to one bit. In other words, if cells are transferred to nodes 2, 4 and 8, the routing field's bits corresponding to the respective nodes are masked. Then, the ATM switching apparatus ascertains the masked bits in the routing field and transfers the cells to the corresponding nodes.

Of course, the user control field is an area which a user can define. Accordingly, the user control field can be used as the routing field by defining the user control field as the routing field. If the user control field, except for a standard control field, is used as the routing field, a maximum of twenty-eight nodes can be supported.

For purposes of illustration only, it is assumed that the cell format construction of embodiments of the present invention has a routing field, which can support sixteen nodes. The reception cell temporary storage units 312-1 to 312-*n* include at least sixteen or more first-in first-outs (FIFOs), and the respective FIFOs are set so that the cells corresponding to the respective nodes can be stored therein. For example, when the reception interface 310 receives the cell from the node 2, the received cell is stored in the FIFO corresponding to the node 2.

The reception cell control unit 320 sequentially loads the cells stored in the reception cell temporary storage units 312-1 to 312-*n*, and then checks a destination address and the transfer times value from the routing field of the loaded cell. Here, the destination address is an address corresponding to a destination of the to-be-transferred cell and there can exist only one or several destination addresses according to an extent of masking in the sixteen bits of the routing field. For example, in case '1' is masked at the bit 3 of the routing field, there exists only one destination address, i.e., node 3. Alternatively, if bits 2, 6 and 12 of the routing field are masked with '1', respectively, there exist three destination addresses, i.e., nodes 2, 6 and 12.

Additionally, the reception cell control unit 320 reads out a cell buffer address from the cell buffer address storage unit 332 so as to store the cell into the cell storage unit 330. Here, the cell buffer address indicating a current empty cell buffer is stored in the cell buffer address storage unit 332. The cell buffer address is provided by the scheduler, which will be described later in detail.

The reception cell control unit 320 stores the cell into the cell storage unit's cell buffer corresponding to the cell buffer address. The cell storage unit 330 includes a plurality of cell buffers, and the to-be-transferred cells are stored into the respective cell buffers one by one.

The reception cell control unit 320 stores the cell buffer address into the schedule queue 361 according to the checked destination address of the cell. The schedule queue 361 consists of sixteen sub-schedule queues 361-1 to 361-*n* in total. Destination addresses are allocated to the respective sub-schedule queues. For example, if the destination addresses checked by the reception cell control unit 320 are node 2 and node 4, the cell buffer addresses are stored in the sub-schedule queues to which node 2 and node 4 are allocated.

The reception cell control unit 320 stores the transfer times value, which are checked from the cell, into the subtable corresponding to the cell buffer address. The schedule table 363 includes the subtables as many as the number of the cell buffers, and the cell buffer addresses are allocated to the respective subtables.

The scheduler 360 reads out the cell buffer addresses by sequentially loading them from the sub-schedule queues 361-1 whose destination address is "1". The scheduler 360 provides the transmission cell control unit 340 with the control information including the cell buffer addresses and the destination addresses. Then, the transmission cell control unit 340 loads the cells from the cell buffers corresponding to the cell buffer addresses and stores them into the FIFOs of the transmission cell temporary storage units 351-1 to 351-$n$ corresponding to the destination addresses. Thereafter, the cells are transferred to the corresponding destination addresses through the transmission interface 350.

Meanwhile, the scheduler 360 loads the transfer times value from the schedule table 363 using the cell buffer addresses and determines whether or not a value made by subtracting "1" from the transfer times value is "0". If the value is "0", the scheduler 360 judges that the transfer of the cell is not needed any more, and thus the scheduler 360 stores the cell buffer address into the cell buffer address storage unit 332.

On the contrary, if the value is not "0", the scheduler 360 stores the value (which is made by subtracting "1" from the transfer times value) into a corresponding subtable of the schedule table 363. At this time, the corresponding subtable is a table on which the scheduler 360 loads the transfer times value. In other words, the clause that the value is not "0" means that there is still another destination address. In that case, when the scheduler 360 loads the corresponding destination address from the schedule queue 361 later, the control information is again provided to the transmission cell control unit 340 and the cell stored in the cell buffer address is transferred to the corresponding destination address.

The scheduler 360 provides the transmission cell control unit 340 with the control information including the destination addresses and the cell buffer addresses, and the transmission cell control unit 340 loads the corresponding cells from the cell storage unit 330 based on the cell buffer addresses. Then, the transmission cell control unit 340 stores the corresponding cells into the FIFOs of the transmission cell temporary storage units 351-1 to 351-$n$ corresponding to the corresponding cells. The transmission interface 350 sequentially loads the transmission cells from the respective FIFOs of the transmission cell temporary storage units 351-1 to 351-$n$ and then transfers them to the respective destination addresses.

Figure 4:
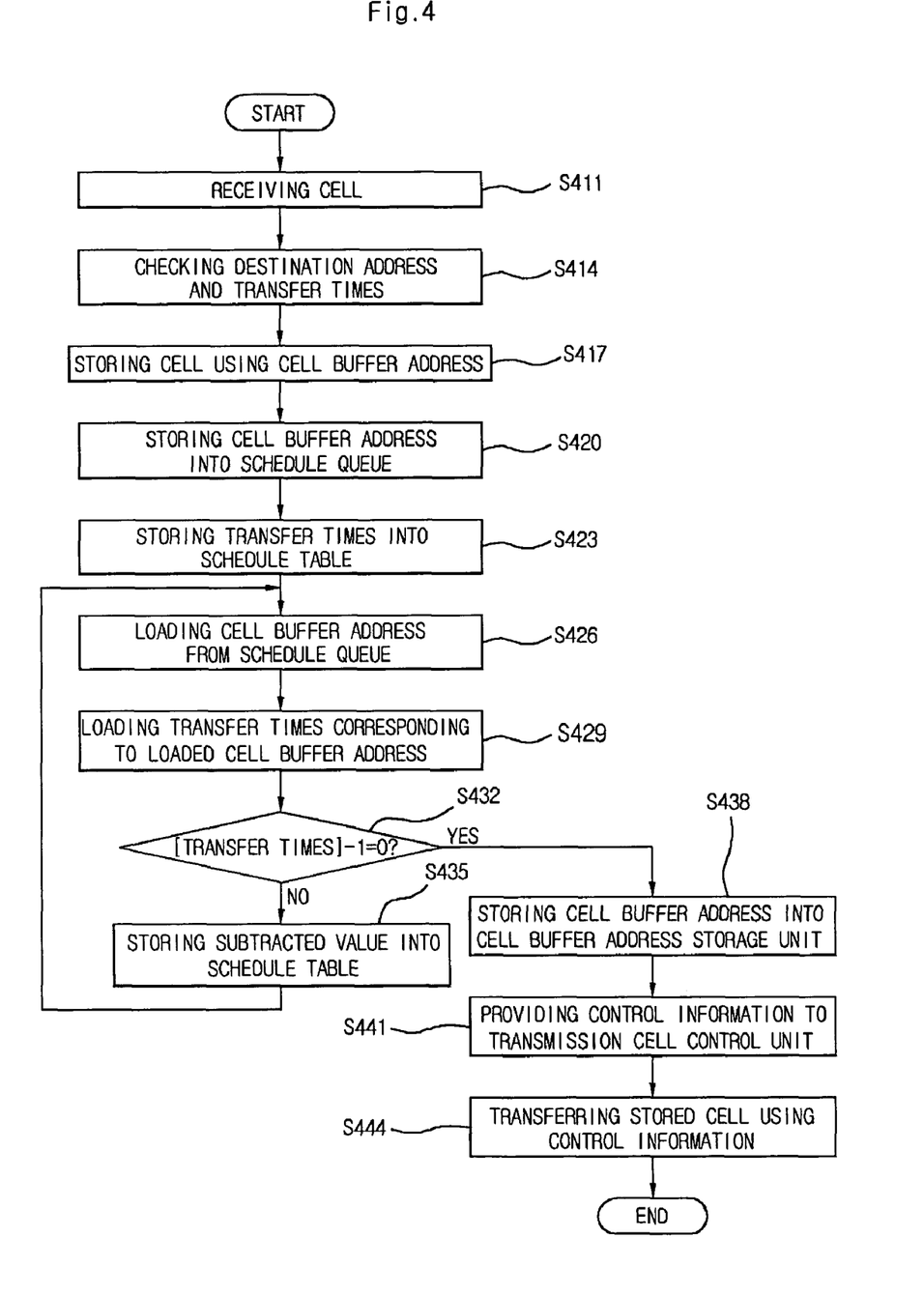
FIG. 4 is a flowchart showing a method of switching cells in an ATM switching apparatus in accordance with embodiments of the present invention.

FIG. 4 is a flowchart showing the method of switching the cells in an ATM switching apparatus in accordance with an embodiment of the present invention. The cells received through the reception interface are stored into the reception cell temporary storage unit and then the received cells stored in the reception cell temporary storage unit are loaded by the reception cell control unit (S411).

The reception cell control unit ascertains whether or not there is a bit set to "1" among the allocated bits in the routing field of the received cell. If a bit is set to "1" in the routing field of the received cell, the destination address corresponding to the bit is checked. Then, the transfer times value is calculated by determining how many destination addresses are checked (S414). For example, if the routing field of the received cell has bits 3 and 5 set to "1", the received cell is a cell whose destination address is to be transmitted to node 3 and node 5, and thus the transfer times value is two.

The transmission cell control unit reads out a current empty cell buffer address (e.g., "10") from the cell buffer address storage unit and the received cell is stored into the cell storage unit's cell buffer corresponding to the cell buffer address (S417). Additionally, the transmission cell control unit stores the cell buffer addresses into the schedule queue's sub-schedule queues corresponding to the destination addresses (S420). For example, if the destination addresses are node 3 and node 5, the cell buffer addresses are stored into the sub-schedule queues to which node 3 and node 5 are allocated.

Further, the transmission cell control unit stores the transfer times value (e.g., two) into the schedule table's subtable corresponding to the cell buffer address (S423). In other words, the transfer times value (two) is stored into the schedule table's subtable corresponding to the cell buffer address "10".

In this manner, the ATM switching apparatus of embodiments of the present invention checks the destination addresses and the transfer times value with respect to the cells received through the reception interface. When the destination addresses and the transfer times value are checked, the cell buffer addresses are provided from the cell buffer address storage unit and the cells are stored into the cell storage unit according to the cell buffer addresses. At the same time, the transfer times value is stored into the schedule table. Meanwhile, the cell buffer addresses are stored into the schedule queue according to the destination addresses. Accordingly, the cells to be transmitted to the destination addresses are stored into the cell storage unit at each cell buffer address, and the cell buffer addresses are stored at the destination addresses allocated to the schedule queue. The transfer times value is stored into the schedule table according to the cell buffer addresses. The scheduler sequentially loads the schedule queues in which the cell buffer addresses are stored (S426).

Preferably, the cell buffer address stored in the sub-schedule queue to which the destination address (i.e., node 1) is allocated is loaded. Then, the cell buffer addresses stored in the sub-schedule queues to which the nodes 2 and 3 are respectively allocated are loaded in sequence. For example, the cell buffer address "10" is stored in the sub-schedule queues to which the nodes 3 and 5 are allocated. If the scheduler 360 loads the sub-schedule queue of the node 3, the cell buffer address "10" is loaded. In addition, if the sub-schedule queue of the node 5 is loaded after loading a sub-schedule queue of a node 4, the cell buffer address "10" is loaded.

Meanwhile, the scheduler is provided with the transfer times value to correspond to the loaded cell buffer address from the schedule table (S429). In other words, if the scheduler transfers the cell buffer address to the schedule table, the schedule table reads out the transfer times value stored in the subtable corresponding to the cell buffer address and then provides the scheduler with the transfer times value. Then, the scheduler determines whether or not a value made by subtracting "1" from the transfer times value is "0" (S432).

If the value is not "0", the scheduler judges that the cell stored in the cell storage unit is transferred to another destination address (node 5) so as to make it correspond to the cell buffer address. Therefore, the value is stored into the schedule table so as to make it correspond to the cell buffer address (S435).

In the above example, because the transfer times value is two, the value becomes "1". Since the value "1" is not "0", the scheduler again stores the value "1" into the schedule table's subtable corresponding to the cell buffer address (e.g., "10").

In this manner, in case the value is not "0", when loading the cell buffer address (e.g., "10") stored in the sub-schedule queue corresponding to the additional destination address (node 5), the control information including the destination address (node 5) and the cell buffer address are again transferred to the transmission cell control unit. Then the cell corresponding to the cell buffer address and stored in the cell storage unit is loaded and transmitted to the destination address (node 5). These procedures are performed until the value made by subtracting "1" from the transfer times value becomes "0".

Meanwhile, as the determination result, if the value made by subtracting "1" from the transfer times value is "0", the cell buffer address is stored into the cell buffer address storage unit (S438). Here, the value is "0" means that the cell stored in the cell storage unit need not be transferred to additional destination addresses (e.g., node 5) so that it can correspond to the cell buffer address. In that case, the cell buffer address is stored into the cell buffer address storage unit so it can be used again as an address for storing other cells that the reception cell control unit receives into the cell storage unit.

Additionally, the scheduler provides the transmission cell control unit with the control information checked by the schedule queue (S441). Here, the control information includes the destination address and the cell buffer address. For example, if the scheduler loads the sub-schedule queue of node 3, the destination address (node 3) and the cell buffer address "10" are provided to the transmission cell control unit.

Using the cell buffer address, the transmission cell control unit, which receives the control information including the destination address (in this case, node 3) and the cell buffer address, loads the corresponding cell from the cell storage unit. Then the transmission cell control unit stores the loaded cell into the transmission cell temporary storage unit corresponding to the destination address (node 3). The cell that is temporarily stored in the transmission cell temporary storage unit is transferred to the corresponding destination address (node 3) through the transmission interface (S444).

As described above, according to the ATM switching apparatus and method of embodiments of the present invention, the number of the destination address is checked based on the routing field of the received cell. If there are several destination addresses, the cell buffer address allowing the received cells to be stored in the respective destination addresses are stored into the schedule queue. Meanwhile, the transfer times value is also stored into the schedule table so that it can correspond to the cell buffer address.

When the scheduler sequentially loads the schedule queue, the control information is transferred to the transmission cell control unit and thus the corresponding cell can be transferred to the corresponding destination address. Further, whether the identical cell is to be transferred to the destination addresses different from each other is checked by determining whether or not the value made by subtracting "1" from the transfer times value is "0". Accordingly, whether to transfer the cell to several destination addresses is masked to the routing field of the ATM cell, the identical cells stored in the cell buffer addresses can be transferred to the several destination addresses. When the scheduler loads the cell buffer address existing in the several destination addresses, the schedule queue is managed to store the cell buffer address, in which a current cell is stored, into the several destination addresses.

Since the related art ATM switching apparatus individually transfers the cells to several destination addresses by switching them to corresponding destinations using the transmission table, it takes significant time to transfer the cells. However, according to the ATM switching apparatus of embodiments of the present invention, it is possible to reduce the time taken to transfer the cells and simplify its complex process. Further, cell transmission efficiency and performance of the ATM switching apparatus can be improved.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An ATM switching method comprising:
   storing a received cell, a cell buffer address and a transfer times value, wherein the received cell includes a destination address and the transfer times value and wherein a cell buffer address storage unit stores the cell buffer address;
   transferring the received cell according to control information obtained by loading a scheduler with respect to a schedule queue in which the cell buffer address is stored;
   determining whether or not to further transfer the received cell using the transfer times value obtained by the loading of the scheduler; and
   if there are not any received cells to be further transferred, storing the cell buffer address of the control information into the cell buffer storage unit.

2. The ATM switching method of claim 1, wherein the control information includes the destination address and the cell buffer address.

3. The ATM switching method of claim 1, further comprising the step of updating a subtracted value of the transfer times value to the same area in which the previous transfer times value is stored if the cell is to be further transmitted.

4. An ATM switching method comprising:
   checking a destination address and a transfer times value from a cell temporarily stored through a reception interface, and receiving a cell buffer address from a cell buffer address storage unit;
   storing the cell into a cell buffer corresponding to the cell buffer address, storing the transfer times value into a schedule table corresponding to the cell buffer address, and storing the cell buffer address into a schedule queue corresponding to the destination address;
   obtaining a first control information by loading the schedule queue in sequence; and
   transferring the cell stored in the cell buffer through a transmission interface based on the control information;
   obtaining the transfer times value from the schedule table using the cell buffer address of the first control information obtained from the scheduler;

determining whether or not a subtracted value of the transfer times value is zero; and if the subtracted value is not zero, again storing the subtracted transfer times value into the schedule table corresponding to the cell buffer address.

5. The ATM switching method of claim 4, wherein the first control information includes a first destination address and a cell buffer address.

6. The ATM switching method of claim 4, further comprising the step of storing the cell buffer address of the first control information into the cell buffer address storage unit if the subtracted value is zero.

7. The ATM switching method of claim 4, further comprising:

if the subtracted transfer times value is again stored into the schedule table, obtaining a second control information by loading the schedule queue in sequence; and transferring the cell stored in the cell buffer through the transmission interface based on the second control information.

8. The ATM switching method of claim 7, wherein the second control information includes a second destination address and a cell buffer address.

9. An ATM switching method comprising:

checking a destination address and a transfer times value from a cell temporarily stored through a reception interface, and receiving a cell buffer address from a cell buffer address storage unit;

storing the cell into a cell buffer corresponding to the cell buffer address, storing the transfer times value into a schedule table corresponding to the cell buffer address, and storing the cell buffer address into a schedule queue corresponding to the destination address;

obtaining a fast control information by loading the schedule queue in sequence; and transferring the cell stored in the cell buffer through a transmission interface based on the control information;

wherein a first destination address of the first control information is different from a second destination address of a second control information.

10. An ATM switching method comprising:

checking a destination address and a transfer times value from a cell temporarily stored through a reception interface, and receiving a cell buffer address from a cell buffer address storage unit;

storing the cell into a cell buffer corresponding to the cell buffer address, storing the transfer times value into a schedule table corresponding to the cell buffer address; and storing the cell buffer address into a schedule queue corresponding to the destination address;

obtaining a first control information by loading the schedule queue in sequence; and transferring the cell stored in the cell buffer through a transmission interface based on the control information;

wherein the cell buffer address of the first control information is identical to a cell buffer address of a second control information.

11. An ATM switching apparatus comprising:

a reception cell control means for checking a destination address and a transfer times value from a cell received trough a reception interface, storing a cell buffer address provided from a cell buffer address storage means into a schedule queue corresponding to the destination address, and storing the transfer times value into a schedule table corresponding to the cell buffer address;

a scheduler for obtaining a first control information by loading the schedule queue, and determining whether or not there is another destination address to be transferred using the first control information; and a transmission cell control means for transferring the cell through a transmission interface according to the first control information provided from the scheduler;

wherein the destination address is allocated to the schedule queue, and a plurality of sub-schedule queues are provided, the cell buffer address being stored in the sub-schedule queues corresponding to the destination address masked to the cell.

12. The ATM switching apparatus of claim 11, wherein the reception cell control means stores the cell into a cell storage means corresponding to the cell buffer address.

13. The ATM switching apparatus of claim 12, wherein the cell storage means includes a plurality of cell buffers to which cell buffer addresses are allocated.

14. The ATM switching apparatus of claim 11, wherein the first control information includes a first destination address and a cell buffer address.

15. An ATM switching apparatus comprising:

a reception cell control means for checking a destination address and a transfer times value from a reception cell received through a reception interface, storing a cell buffer address provided from a cell buffer address storage means into a schedule queue corresponding to the destination address, and storing the transfer times value into a schedule table corresponding to the cell buffer address;

a scheduler for obtaining a first control information by loading the schedule queue, and determining whether or not there is another destination address to be transferred using the first control information; and a transmission cell control means for transferring the reception cell through a transmission interface according to the first control information provided from the scheduler;

wherein the schedule table includes a plurality of subtables to which the cell buffer addresses are allocated, the number of subtables being equal to that of cell buffers provided at a cell storage means.

16. An ATM switching apparatus comprising:

a reception cell control means for checking a destination address and a transfer times value from a reception cell received through a reception interface, storing a cell buffer address provided from a cell buffer address storage means into a schedule queue corresponding to the destination address, and storing the transfer times value into a schedule table corresponding to the cell buffer address;

a scheduler for obtaining a first control information by loading the schedule queue, and determining whether or not there is another destination address to be transferred using the first control information; and a transmission cell control means for transferring the reception cell through a transmission interface according to the first control information provided from the scheduler;

wherein the scheduler determines whether or not a subtracted value of the transfer times value is zero, and if the subtracted value is zero, the cell buffer address of the first control information is stored into the cell buffer address storage means.

17. The ATM switching apparatus of claim 16, wherein if the subtracted value is not zero, the subtracted transfer times value is stored into the schedule table so as to correspond to the cell buffer address.

18. The ATM switching apparatus of claim 17, wherein if the scheduler stores the subtracted transfer times value into the schedule table, a second control information is obtained from the schedule queue and transferred to the transmission cell control unit, and the cell stored in the cell buffer is transferred through the transmission interface.

19. The ATM switching apparatus of claim 18, wherein the second control information includes a second destination address and a cell buffer address.

* * * * *